United States Patent Office 3,398,068
Patented Aug. 20, 1968

3,398,068
NOVEL COMPOUNDS OF TANTALUM
AND COLUMBIUM AND PROCESS
FOR PREPARATION
Geoffrey W. Mellors, North Royalton, and Seymour
Senderoff, Fairview Park, Ohio, assignors to Union
Carbide Corporation, a corporation of New York
No Drawing. Filed Oct. 7, 1964, Ser. No. 402,352
23 Claims. (Cl. 204—61)

ABSTRACT OF THE DISCLOSURE

Tantalum hexafluoride and columbium hexafluoride are novel compounds produced by electrolyzing an electrolytic system comprising a base melt of at least one alkali or alkaline earth fluoride and at least one fluoride of tantalum or columbium. These compounds are useful as high temperature fluorinating agents and for use in stripping tantalum plated surfaces.

This invention relates to novel compounds of tantalum and columbium. In one aspect, this invention relates to novel hexavalent compounds of tantalum and columbium, e.g., tantalum hexafluoride and columbium hexafluoride. In a further aspect, this invention is directed to mixtures containing hexavalent compounds of either tantalum or columbium. In another aspect, this invention relates to a process for the preparation of the aforementioned novel compounds.

Although one of the largest single uses for tantalum or columbium is as the pure metal, for example, in the mancfacture of acidproof equipment, neither tantalum nor columbium occur in the free state in nature. However, both elements are found in a number of minerals at widely scattered points on the earth's surface. They usually occur in combination with one or more other materials, such as iron, manganese, silicon, titanium, and the like. The commercially important minerals of these metals are tantalite and columbite which are variations of the same mineral (Fe, Mn) (Ta, Cb)$_2$O$_6$. The mineral is called tantalite when its Ta$_2$O$_5$ content exceeds its Cb$_2$O$_5$ content.

Heretofore, no reference has been found in the literature to any compound of these elements with valences greater than five. In all the reported naturally occurring minerals and in compositions or complexes containing these elements, the highest and more common valence state is +5, although it can also be +3 or +4. Since the pentavalent ions of tantalum and columbium are characterized by a closed shell electronic configuration typical of rare gases, that is, 2, 8, 18, 32, 8 for tantalum and 2, 8, 18, 8 for columbium one would not expect additional electrons to be removed from them to produce the ions of a higher valence.

However, it has now been found that novel tantalum or columbium compounds can be prepared wherein the metal exists in the hexavalent state. These novel compositions are conveniently prepared, as hereinafter described, by the electrolysis of solutions containing pentavalent tantalum or columbium fluorides. Moreover, these novel compositions were found to be extremely powerful oxidizing agents and hence useful in a wide variety of applications.

Accordingly, one or more of the following objects will be achieved by the practice of the instant invention. It is an object of this invention to provide novel compounds of tantalum and columbium. A further object of this invention is to provide novel hexavalent compounds of tantalum and columbium. Another object is to provide tantalum hexafluoride and columbium hexafluoride. A still further object of this invention is to provide novel mixtures of hexavalent tantalum and columbium compounds with alkali fluorides. Another object of this invention is to provide novel mixtures of tantalum hexafluoride and columbium hexafluoride with eutectic mixtures of sodium, potassium, and lithium fluorides. A further object is to provide a novel process for the preparation of the aforesaid compositions. These and other objects of the invention will readily become apparent to those skilled in the art in light of the teachings herein set forth.

In its broad aspect, the invention is directed to novel hexavalent compounds of tantalum and columbium, and a process for their preparation. The process of the invention comprises electrolyzing an electrolytic system comprising:

(1) an electrically conductive base material as a cathode;
(2) an inert anode;
(3) an electrolytic melt having no appreciable concentration of chlorides, bromides, and oxides and consisting essentially of—
(a) a base melt of at least one alkali or alkaline earth fluoride, and
(b) at least one fluoride of a metal selected from the class consisting of tantalum and columbium.

The proportions of the fluorides in the melt, the temperature of the melt, and the electrolyzing current density being adjusted to produce novel fluoride compounds wherein the metal, tantalum or columbium, is in the +6 valence state. By the aforementioned process, a variety of novel hexavalent tantalum and columbium fluorides can be prepared, such as, tantalum hexafluoride, columbium hexafluoride, and complexes of these with the components of the base melt, e.g., 3KF·TaF$_6$, 2KF·TaF$_6$, KF·TaF$_6$, and the like. These novel fluorides, as hereinafter indicated, possess unique properties which render them especially useful for a wide variety of applications.

The process of the present invention is also particularly useful for the preparation in situ of novel hexavalent tantalum and columbium fluorides in solutions of molten alkali fluorides. For instance, tantalum hexafluoride can be prepared in a molten eutectic mixture of sodium fluoride, potassium fluoride and lithium fluoride, hereinafter also referred as Flinak. The resulting solution finds particular application in stripping deposited metallic tantalum and columbium from articles which have been previously plated. Thereafter, the same solution containing the stripped tantalum or columbium can be used again to replate the same or other articles, after the hexavalent materials have been reduced by the stripping operation to the valence states preferred for plating.

As hereinbefore indicated, the hexavalent compounds of tantalum and columbium are prepared by the electrolysis of solutions of pentavalent tantalum and columbium fluorides dissolved in molten alkali fluorides with a suitable conducting cathode and an inert anode, such as graphite. In contrast to the electrolysis of molten chlorides, mixed chlorides and fluorides, and mixed fluorides and oxides, wherein only oxygen or chlorine are produced at the anode, the present process provides a convenient route to higher valence tantalum and columbium compounds. Only in the case of an essentially pure fluoride system was it observed that no gas is produced at the anode, but that instead, the higher valence tantalum or columbium fluoride was formed. In fact it was observed that copious fluorine evolution occurs at the anode when a molten alkali fluoride mixture alone was electrolyzed with a graphite anode. However, on addition of only a few percent of either $K_2TaF_7$ or $K_2CbF_7$ gas evolution ceased instantly and hexavalent compounds were formed.

The electrolytic melt employed in the preparation of the novel compositions of this invention consists of at least one fluoride of the metal to be oxidized and the base melt, i.e., the melt without any fluorides of the metal to be oxidized. The base melt is at least one alkaline or alkaline earth fluoride. One preferred base melt which can be used is the eutectic composition of the fluorides of lithium, sodium, and potassium, which consists of 29.25 weight percent LiF, 11.70 weight percent NaF, and 59.05 weight percent KF and has a melting point of about 454° C. Other suitable base melts for the various metals can also be employed.

The concentration of the fluoride of the metal to be oxidized in the electrolytic melt depends on the particular base melt, temperature, and current density employed and on the particular metal itself. When either columbium, or tantalum are oxidized by the present process the fluoride of the metal to be oxidized should be dissolved in the base melt in a concentration between about 5 and about 30 weight percent, preferably between about 5 and about 15 weight percent, based on the simple metal fluoride, and the concentration should be maintained within the range throughout the electrolyzing process.

The metal fluoride employed may be simple or complex; but if a complex fluoride is used, its cation must be higher in the electromotive series than the metal to be oxidized, and its anion must not contain oxygen. Typical useful metal fluorides are the simple fluorides and double fluorides such as potassium heptafluocolumbate (V), potassium heptafluotantalate (V), and the like.

The electrolytic oxidation step should be carried out in an inert, nonoxidizing atmosphere such as argon, neon, helium, or the like, or under vacuum conditions. If an inert gas is employed, it may be at a pressure above or below atmospheric pressure, as long as it is substantially inert with respect to the melt and the metal fluoride compound. The container for the melt may be made of any material which has no deleterious effect on the melt or the oxidized metal fluoride and is not attacked by the melt during operation.

The operating limits for the electrolyzing temperature and current density depend on the particular melt employed and on the metal being oxidized. Also, the upper most limit for the current density generally decreases as the concentration of the pentavalent metal fluoride in the melt decreases. Of course, the temperature of the electrolyte must always be above the melting point of the particular melt employed. For example, pentavalent tantalum can be oxidized at a cathode current density of 5 to 100 ma./cm.², preferably 40 ma./cm.², and a temperature of 700 to 850° C., preferably 800° C.; and columbium at 5 to 100 ma/cm.², preferably 50 ma./cm.², and 675 to 850° C., preferably 770° C. The anode current density for both tantalum and columbium is from about 25 to about 1000 ma./cm.². In practice, the lower limit of anode current density is established by excessively high rate of reduction at the cathode, and the upper limit established by excessive polarization of the anode. It will be understood that these are only illustrative examples of suitable operating conditions for the oxidation of the various metal fluoride compounds, and that the hexavalent metal fluoride can be produced at many other conditions.

A wide variety of electrically conductive materials are available for use as the cathode. The only limitations on the cathode material for this particular process are that it be not excessively reactive with the melt. For example, satisfactory results are obtained with the use of stainless steel, graphite, nickel, and copper. The actual choice of a particular cathode material in any specific case depend on several factors.

Confirmation of the hexavalent state for both tantalum and columbium was effected by two independent chronopotentiometric measurements. By an anodic chrono-potentiogram, data was obtained to plot the potential versus $$\log \frac{\tau^{1/2} - t^{1/2}}{t^{1/2}}$$

wherein $\tau$ is the transition time and $t$ is an arbitrary time. The slope was $2.303 RT/nF$ where $n$ is the number of electrons involved is the oxidation step. Measurements from a number of anodic chronopotentiograms of solutions of tantalum pentafluoride and columbium pentafluoride in eutectic mixtures of sodium, potassium, and lithium fluorides gave an average value of $n$ of 1.1 for the tantalum determinations and 0.95 for the columbium determinations.

By cathodic chronopotentiometric measurements the value of the diffusion coefficient of the reacting species was obtained. This, together with the slope of the plot of $c$ versus:

$$\frac{i\tau^{1/2}}{c}$$

wherein $c$ is the concentration of the refractory metal ion and $i$ the current density, gave a value of $n$ equal to unity for both the tantalum and columbium. Hence, in both of the aforementioned cases, the chronopontentiometric measurements indicated that a single electron was removed from the pentavalent ion in the anodic reaction thereby producing the hexavelent tantalum and columbium ions.

The novel hexavalent compounds of tantalum and columbium which are prepared in accordance with the teachings of this invention are useful in a wide variety of applications. For instance, both tantalum hexafluoride and columbium hexafluoride are particularly effective as high temperature fluorinating agents. While the hexavalent compounds are stable indefinitely at the temperatures employed in electrolysis of the electrolytic melt, i.e., above about 700° C., on cooling they liberate fluorine in accordance with the equations:

$$TaF_6 \rightarrow TaF_5 + \tfrac{1}{2} F_2$$

$$CbF_6 \rightarrow CbF_5 + \tfrac{1}{2} F_2$$

Additionally, these compounds are also useful in a wide variety of applications wherein an oxidizing agent is desired. The hexavalent ions are strong oxidizing agents, the equilibrium redox potentials being +0.20 v. for $$Ta^{5+} \rightleftharpoons Ta^{6+} + 1e$$

and 0.25 v. for $Cb^{5+} \rightleftharpoons Cb^{6+} + 1e$, the potentials referred to the $Ni/NiF_2$ Flinak electrode. These are both more than one volt noble to the equilibrium redox potentials of the usual ionic couples:

$$Ta^{5+} \rightleftharpoons Ta^{2+} + 3e$$

$$Cb^{5+} \rightleftharpoons Cb^0 + 5e$$

Hence, tantalum hexafluoride is a useful stripping agent for removing tantalum metal from tantalum plated articles. When dissolved in a molten eutectic mixture of sodium, potassium, and lithium fluorides, the tantalum hexafluoride dissolves tantalum metal. Moreover, both tantalum hexafluoride and columbium hexafluoride are useful, when added, respectively, to a tantalum or columbium plating solution in dissolving any insoluble sludge such as tantalum difluoride or tantalum trifluoride with resulting improvement in the smoothness and quality of the electrodeposited plates.

The following examples are illustrative.

Example I

A solution containing 14.2 weight percent of potassium heptafluotantalate dissolved in the eutectic composition of lithium fluoride, sodium fluoride and potassium fluoride was electrolyzed with a graphite anode and copper cathode at 770° C. and anode and cathode current densities of 100 ma./cm.² for twenty-one hours. At the end of this period 71 percent of the contained tantalum was converted to the hexavalent state. This was confirmed by titrating the oxidized form with a known weight of tantalum metal according to the reaction:

$$5Ta^{6+} + Ta^{0} \rightarrow 6Ta^{5+}$$

the valence state was also independently confirmed by chronopotentiometric measurements which indicated that a single electron had been removed from the pentavalent tantalum in the anodic reaction.

Example II

A solution containing approximately 14 weight percent of potassium heptafluocolumbate dissolved in the eutectic composition of lithium fluoride, sodium fluoride and potassium fluoride was electrolyzed with a graphite anode and copper cathode at 770° C. and anode and cathode current densities of 100 ma./cm.$^2$ for twenty-one hours. At the end of this period the contained columbium was converted to the hexavalent state. The valence state was confirmed by chromopotentiometric measurements which indicated that a single electron had been removed from the pentavalent columbium in the anodic reaction.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A fluoride compound of a hexavalent metal ion selected from the class consisting of tantalum and columbium.
2. Tantalum hexafluoride.
3. Columbium hexafluoride.
4. A solution of: (a) a fluoride compound of a hexavalent metal ion selected from the class consisting of tantalum and columbium, dissolved in (b) at least one molten fluoride selected from the class consisting of alkali fluorides and alkaline earth fluorides.
5. A solution of tantalum hexafluoride in molten alkali fluorides.
6. A solution of columbium hexafluoride in molten alkali fluorides.
7. A solution of a fluoride compound of a hexavalent metal ion selected from the class consisting of tantalum and columbium, in a molten eutectic mixture of sodium fluoride, potassium fluoride and lithium fluoride.
8. A solution of tantalum hexafluoride in a molten eutectic mixture of sodium fluoride, potassium fluoride and lithium fluoride.
9. A solution of columbium hexafluoride in a molten eutectic mixture of sodium fluoride, potassium fluoride and lithium fluoride.
10. A process for the preparation of a fluoride compound of a hexavalent metal ion selected from the class consisting of tantalum and columbium, which comprises electrolyzing an electrolytic system comprising:
    (1) an electrically conductive base material as a cathode;
    (2) an inert anode;
    (3) an electrolytic melt having no appreciable concentration of chlorides, bromides, and oxides and consisting essentially of —
        (a) a base melt of at least one fluoride selected from the class consisting of alkali fluorides and alkaline earth fluorides, and
        (b) at least one fluoride of a metal selected from the class consisting of tantalum and columbium, the proportions of said fluorides in said melt, the temperature of said melt, and the electrolyzing current density being adjusted to produce said fluoride compound of said hexavalent metal ion.
11. A process for the preparation of a fluoride compound of a hexavalent metal ion selected from the class consisting of tantalum and columbium, which comprises electrolyzing an electrolytic system comprising:
    (1) an electrically conductive base material as a cathode;
    (2) an inert anode;
    (3) an electrolytic melt having no appreciable concentration of chlorides, bromides, and oxides and consisting essentially of—
        (a) a base melt of at least one alkali fluoride, and
        (b) at least one fluoride of a metal selected from the class consisting of tantalum and columbium, the proportions of said fluorides in said melt, the temperature of said melt, and the electrolyzing current density being adjusted to produce said fluoride compound of said hexavalent metal ion.
12. The process of claim 11 wherein the electrolysis is carried out in a substantially inert atmosphere.
13. A process for the preparation of a fluoride compound of a hexavalent metal ion selected from the class consisting of tantalum and columbium, which comprises electrolyzing an electrolytic system comprising:
    (1) an electrically conductive base material as a cathode;
    (2) an inert anode;
    (3) an electrolytic melt having no appreciable concentration of chlorides, bromides, and oxides and consisting essentially of—
        (a) a base melt containing between about 10 and about 90 weight percent of at least one fluoride selected from the class consisting of alkali fluorides and alkaline earth fluorides, and
        (b) at least one fluoride of a metal selected from the class consisting of tantalum and columbium, the proportions of said fluorides in said melt, the temperature of said melt, and the electrolyzing current density being adjusted to produce said fluoride compound of said hexavalent metal ion.
14. A process for the preparation of a fluoride compound of a hexavalent metal ion selected from the class consisting of tantalum and columbium, which comprises electrolyzing an electrolytic system comprising:
    (1) an electrically conductive base material as a cathode;
    (2) an inert anode;
    (3) an electrolytic melt having no appreciable concentration of chlorides, bromides, and oxides and consisting essentially of—
        (a) a base melt containing between about 10 and about 90 weight percent of at least one alkali fluoride, and
        (b) at least one fluoride of a metal selected from the class consisting of tantalum and columbium, the proportions of said fluorides in said melt, the temperature of said melt, and electrolyzing current density being adjusted to produce said fluoride compound of said hexavalent metal ion.
15. The process of claim 14 wherein the anode current density is between about 25 and about 1000 milliamperes per square centimeter, and the temperature of said electrolytic melt is between about 675 and about 850° C.
16. A process for the preparation of tantalum hexafluoride which comprises electrolyzing an electrolytic system comprising:
    (1) an electrically conductive base material as a cathode;
    (2) an inert anode;
    (3) an electrolytic melt having no appreciable concentration of chlorides, bromides, and oxides and consisting essentially of—
        (a) a base melt containing between about 10 and about 90 weight percent at least one alkali fluoride, and (b) between about 5 and about 30 weight percent at least one fluoride of tantalum, based on the simple fluoride, the proportions of said fluorides in said melt, the temperature of said melt, and the electrolyzing current density being adjusted to produce tantalum hexafluoride.

17. The process of claim 16 wherein the anode current density is between about 25 and about 1000 milliamperes per square centimeter, and the temperature of said electrolytic melt is between about 700 and 850° C.

18. A process for the preparation of columbium hexafluoride which comprises electrolyzing an electrolytic system comprising:
- (1) an electrically conductive base material as a cathode;
- (2) an inert anode;
- (3) an electrolytic melt having no appreciable concentration of chlorides, bromides, and oxides and consisting essentially of—
  - (a) a base melt containing between about 10 and about 90 weight percent at least one alkali fluoride, and
  - (b) between about 5 and about 30 weight percent at least one fluoride of columbium, based on the simple fluoride, the proportions of said fluorides in said melt, the temperature of said melt, and the electrolyzing current density being adjusted to produce columbium hexafluoride.

19. The process of claim 18 wherein the anode current density is between about 25 and about 1000 milliamperes per square centimeter, and the temperature of said electrolytic melt is between about 675 and about 850° C.

20. A process for dissolving a metal selected from the class consisting of tantalum and columbium which comprises contacting said metal with an electrolytic melt having no appreciable concentrations of chlorides, bromides, and oxides and consisting essentially of:
- (a) a base melt of at least one fluoride selected from the class consisting of alkali fluorides and alkaline earth fluorides, and
- (b) at least one fluoride of a hexavalent metal ion selected from the class consisting of tantalum and columbium, said electrolytic melt maintained at a temperature of from about 675° to about 850° C.

21. A process for dissolving a metal selected from the class consisting of tantalum and columbium which comprises contacting said metal with an electrolytic melt having no appreciable concentration of chlorides, bromides, and oxides and consisting essentially of:
- (a) a base melt of at least one alkali fluoride, and
- (b) at least one fluoride of a hexavalent metal ion selected from the class consisting of tantalum and columbium, said electrolytic melt maintained at a temperature of from about 675° to about 850° C.

22. A process for dissolving tantalum metal which comprises contacting said metal with an electrolytic melt having no appreciable concentration of chlorides, bromides, and oxides and consisting essentially of:
- (a) a base melt of at least one alkali fluoride, and
- (b) tantalum hexafluoride, said electrolytic melt maintained at a temperature of from about 675° to about 850° C.

23. A process for dissolving columbium metal which compirses contacting said metal with an electrolytic melt having no appreciable concentration of chlorides, bromides, and oxides and consisting essentially of:
- (a) a base melt of at least one alkali fluoride, and
- (b) columbium hexafluoride, said electrolytic melt maintained at a temperature of from about 675° to about 850° C.

References Cited

FOREIGN PATENTS 618,326   3/1961   Italy.

JOHN H. MACK, *Primary Examiner.*

D. R. VALENTINE, *Assistant Examiner.*